(12) United States Patent
Tsubono et al.

(10) Patent No.: US 9,156,442 B2
(45) Date of Patent: Oct. 13, 2015

(54) PARKING MECHANISM FOR VEHICLE

(71) Applicant: HONDA MOTOR CO., LTD., Tokyo (JP)

(72) Inventors: Toyokazu Tsubono, Wako (JP); Hiroyuki Kita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/252,781

(22) Filed: Apr. 15, 2014

(65) Prior Publication Data
US 2014/0318921 A1    Oct. 30, 2014

(30) Foreign Application Priority Data
Apr. 24, 2013 (JP) ................................. 2013-091324

(51) Int. Cl.
*F16H 63/34* (2006.01)
*B60T 1/00* (2006.01)

(52) U.S. Cl.
CPC ............ *B60T 1/005* (2013.01); *F16H 63/3416* (2013.01); *F16H 63/3425* (2013.01)

(58) Field of Classification Search
CPC .................................. F16H 63/3425
USPC ........................................................ 192/219.5
See application file for complete search history.

(56) References Cited

U.S. PATENT DOCUMENTS

| 7,364,027 B2* | 4/2008 | Matsubara et al. ......... 192/219.5 |
| 8,720,660 B2* | 5/2014 | Kimura et al. ............. 192/219.5 |
| 2013/0056327 A1* | 3/2013 | Schraff ...................... 192/219.5 |

FOREIGN PATENT DOCUMENTS

JP    2004-44689    2/2004

* cited by examiner

*Primary Examiner* — Richard Lorence
*Assistant Examiner* — David Morris
(74) *Attorney, Agent, or Firm* — Mori & Ward, LLP

(57) ABSTRACT

A parking mechanism for a vehicle includes an automatic transmission, a parking gear, a parking pawl, and a parking-pawl turn member. The parking gear is fixed to a part formed by any of an output shaft of the automatic transmission and an intermediate member connected to the output shaft. The parking pawl is turnably attached to a turn shaft that is supported by a plate fastened to a transmission case by a first bolt and a second bolt. The parking-pawl turn member turns the parking pawl into engagement with the parking gear. An extending part formed by extending a support member that turnably supports the part of the automatic transmission is substituted for the plate. The extending part is fastened to the transmission case by the first bolt.

3 Claims, 4 Drawing Sheets

US 9,156,442 B2
PARKING MECHANISM FOR VEHICLE

CROSS-REFERENCE TO RELATED APPLICATIONS

The present application claims priority under 35 U.S.C. §119 to Japanese Patent Application No. 2013-091324, filed Apr. 24, 2013, entitled "Parking Mechanism for Vehicle." The contents of this application are incorporated herein by reference in their entirety.

BACKGROUND

1. Field

The present disclosure relates to a parking mechanism for a vehicle.

2. Description of the Related Art

Japanese Unexamined Patent Application Publication No. 2004-44689 (hereinafter referred to as "Patent Document 1") proposes a parking mechanism for a vehicle, which includes a parking gear fixed to an output member of an automatic transmission, a parking pawl turnably fixed to a turn shaft that is supported by a plate fastened to a transmission case by a first bolt and a second bolt, and a parking-pawl turn member that can turn the parking pawl to lock the parking gear.

More specifically, the parking pawl is turnably fixed to the turn shaft supported by the plate that is fastened to the transmission case by the first bolt and the second bolt and has a triangular shape in side view. The parking pawl is locked by engagement with the parking gear.

SUMMARY

According to one aspect of the present invention, a parking mechanism for a vehicle includes an automatic transmission, a parking gear, a parking pawl, and a parking-pawl turn member. The automatic transmission is housed in a transmission case to change a speed of rotation of a vehicle-mounted driving source input from an input shaft and to transmit the rotation from an output shaft to driving wheels. The parking gear is fixed to a part formed by any of the output shaft of the automatic transmission and an intermediate member connected to the output shaft. The parking pawl is turnably attached to a turn shaft that is supported by a plate fastened to the transmission case by a first bolt and a second bolt. The parking-pawl turn member turns the parking pawl into engagement with the parking gear. An extending part formed by extending a support member that turnably supports the part of the automatic transmission is substituted for the plate. The extending part is fastened to the transmission case by the first bolt.

According to another aspect of the present invention, a parking mechanism for a vehicle includes an automatic transmission, a parking gear, a support member, a parking pawl, and a parking-pawl drive member. The automatic transmission is housed in a transmission case to transmit a rotation of a vehicle-mounted driving source to driving wheels via an input shaft and via an output shaft. The parking gear is fixed to a part of either the output shaft of the automatic transmission or an intermediate member connected to the output shaft. The support member turnably supports the part and has an extending part which is fastened to the transmission case via a first bolt and a second bolt. The parking pawl is turnably attached to a turn shaft that is supported by the extending part. The parking-pawl drive member is configured to turn the parking pawl to engage with the parking gear.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
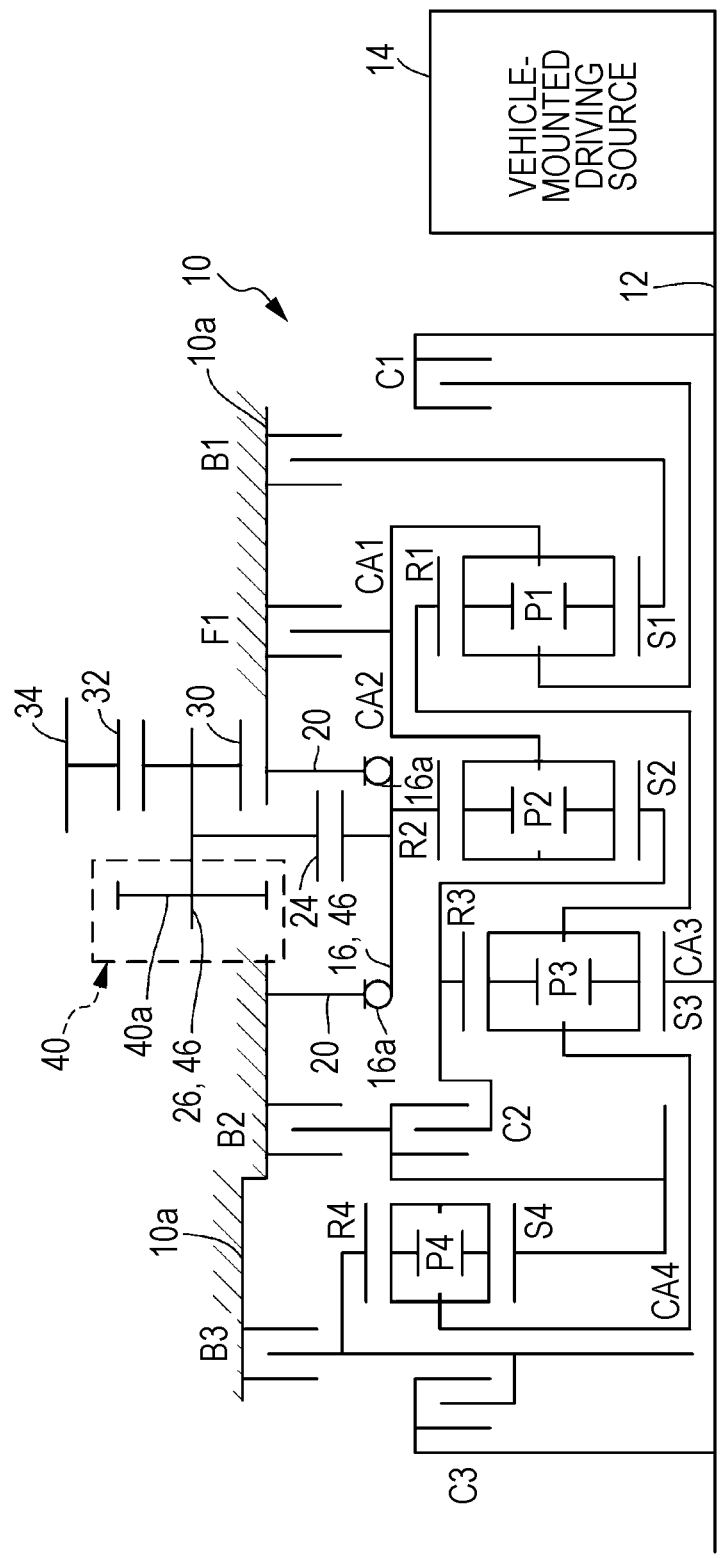
FIG. 1 is a skeleton view illustrating a configuration of an upper part of an automatic transmission around an input shaft, in which a vehicle parking mechanism according to an embodiment of the present disclosure is provided.

The embodiments will now be described with reference to the accompanying drawings, wherein like reference numerals designate corresponding or identical elements throughout the various drawings.

A parking mechanism for a vehicle according to an embodiment of present disclosure will be described with reference to the attached drawings.

Embodiment

Figure 2:
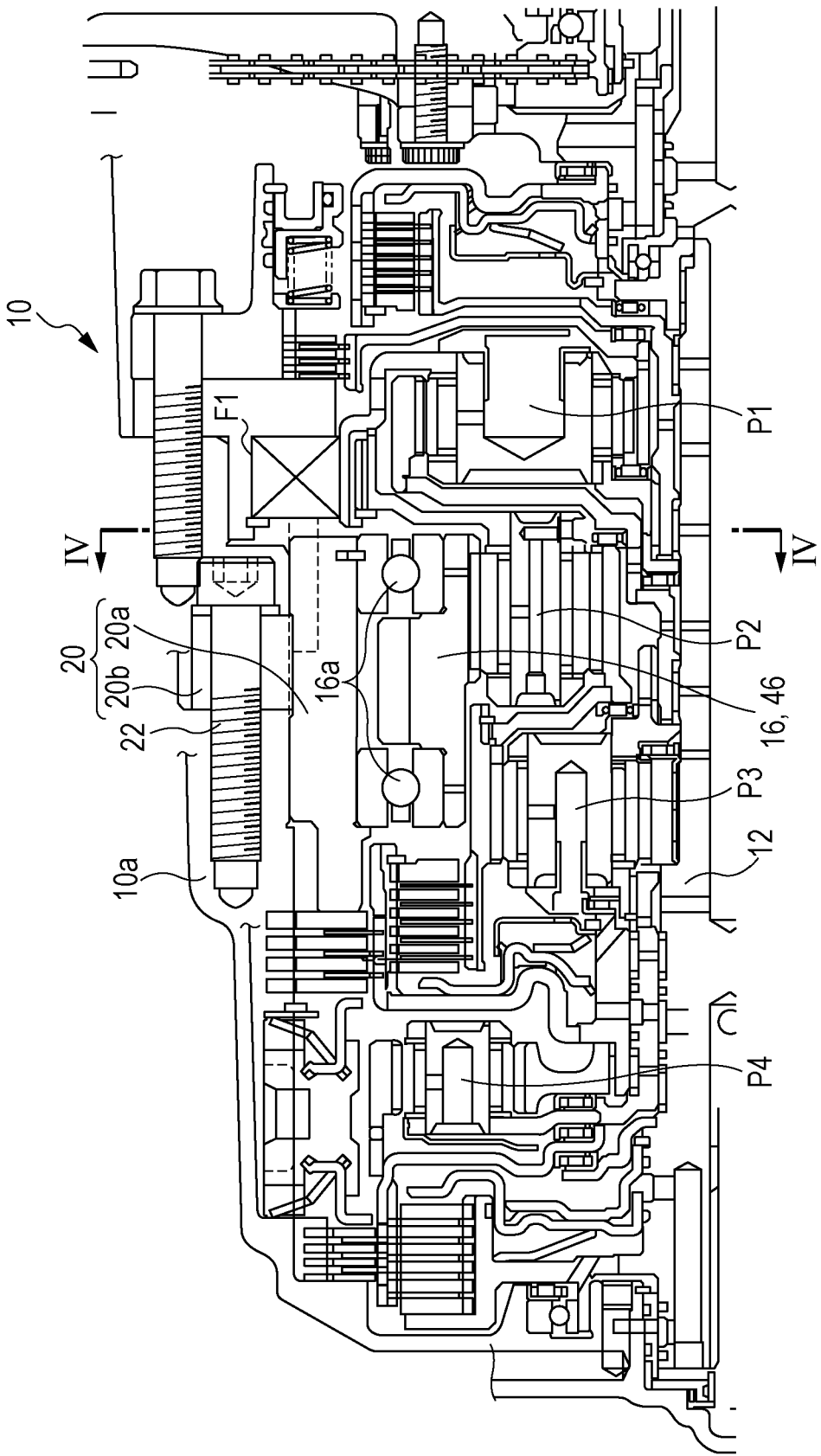
FIG. 2 is a longitudinal sectional view of the automatic transmission illustrated in FIG. 1.
Figure 3:
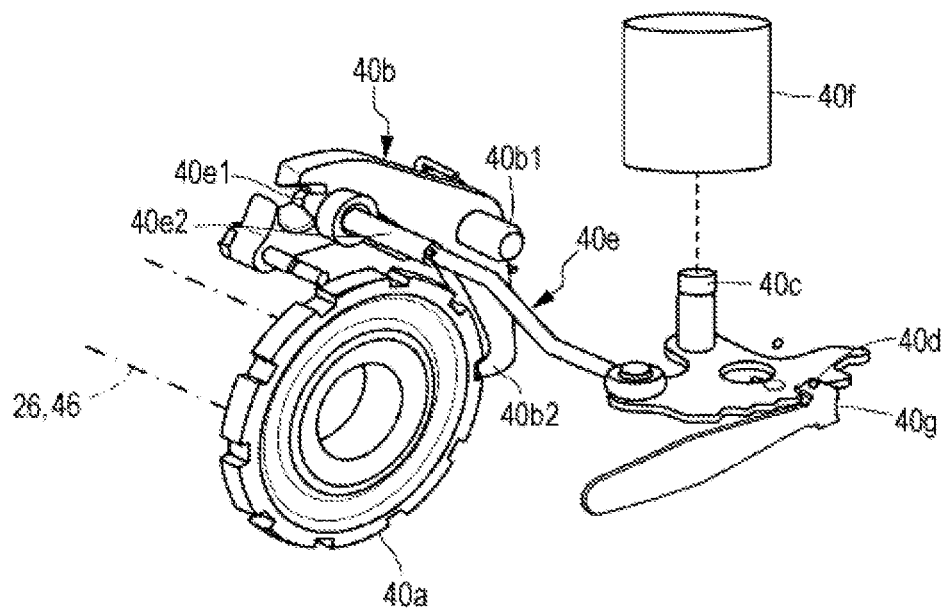
FIG. 3 is an explanatory view of the parking mechanism illustrated in FIG. 1.
Figure 4:
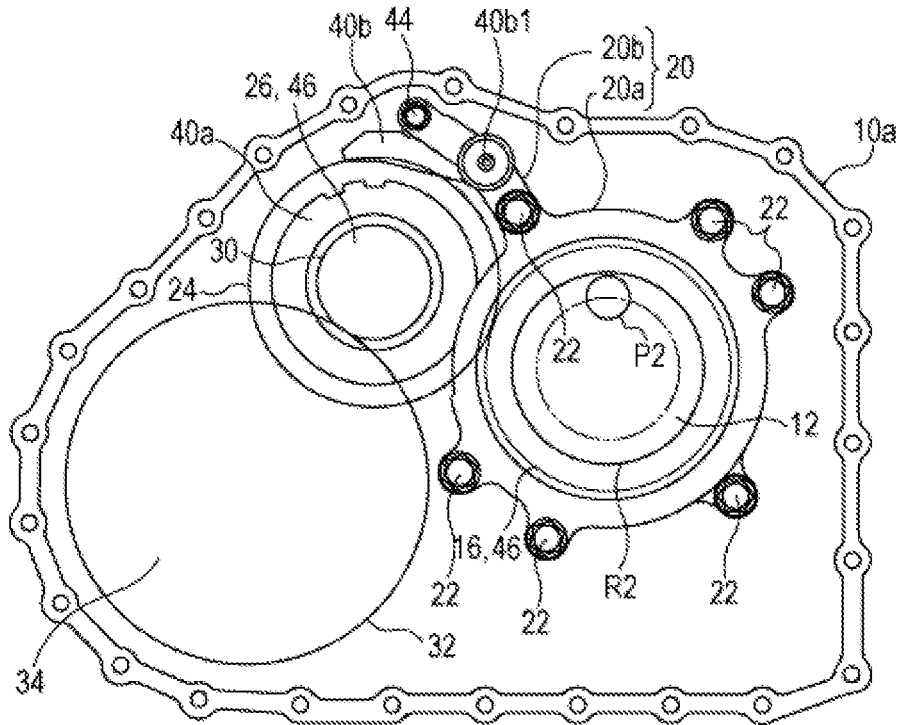
FIG. 4 is a cross-sectional view schematically illustrating an overall configuration of the automatic transmission, as viewed from line IV-IV of FIG. 2.
Figure 5:
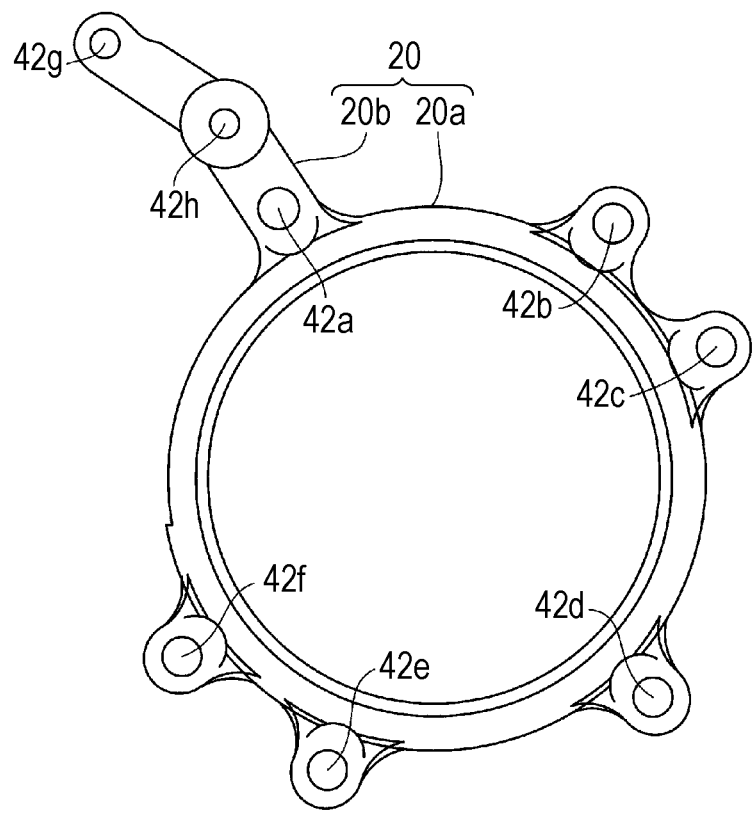
FIG. 5 is an explanatory view of a support member illustrated in FIG. 4.

FIG. 1 is a skeleton view illustrating a configuration of an upper part of an automatic transmission around an input shaft, in which a vehicle parking mechanism according to an embodiment of the disclosure is provided, FIG. 2 is a longitudinal sectional view of the automatic transmission illustrated in FIG. 1, FIG. 3 is an explanatory view of the parking mechanism illustrated in FIG. 1, FIG. 4 is a cross-sectional view schematically illustrating an overall configuration of the automatic transmission, as viewed from line IV-IV of FIG. 2, and FIG. 5 is an explanatory view of a support member illustrated in FIG. 4.

Referring to FIG. 1, an automatic transmission 10 is a planetary gear transmission having gear positions of ten forward speeds and one reverse speed. The automatic transmission 10 is housed in a transmission case 10a.

In the automatic transmission 10, an input shaft 12 is connected via a torque converter (not illustrated) to a vehicle-mounted driving source (an internal combustion engine, an electric motor, or a combination thereof, hereinafter referred to as a "driving source") 14 mounted in a vehicle (not illustrated). Rotation (rotational driving force) is input from the vehicle-mounted driving source 14 to the input shaft 12.

The automatic transmission 10 includes first to fourth planetary gear mechanisms composed of pinions P1, P2, P3, and P4, sun gears S1, S2, S3, and S4, ring gears R1, R2, R3, and R4, and carriers CA1, CA2, CA3, and CA4, respectively.

The speed of the rotation of the vehicle-mounted driving source 14 input from the input shaft 12 is changed to any of ten forward speeds and one reverse speed by rotating the four planetary gear mechanisms while engaging/disengaging clutches C1, C2, and C3 and brakes B1, B2, B3, and F1. Then, the rotation is transmitted from the ring gear R2 of the second planetary gear mechanism to a shaft 16.

The clutches C1, C2, and C3 and the brakes B1, B2, and B3 are each formed by a multiplate clutch that is operated by supply of hydraulic pressure, and the brake F1 is formed by a one-way/two-way switch clutch.

As illustrated in FIG. 2, the shaft 16 is rotatably supported via bearings (ball bearings) 16a, and is fixed to the transmission case 10a by a support plate (support member) 20. The support plate 20 is fastened (fixed) to the transmission case 10a by bolts 22.

Referring again to FIG. 1, the shaft 16 is connected to an intermediate shaft 26 via a gear 24. The intermediate shaft 26 is connected via gears 30 and 32 to an output shaft (foot shaft) 34 that is connected to driving wheels (not illustrated). A parking gear 40a in a parking mechanism 40 is fixed to the intermediate shaft 26.

FIG. 3 illustrates the parking mechanism 40.

As illustrated in FIG. 3, the parking mechanism 40 has a known structure, and includes a parking gear 40a, a parking pawl 40b, a control shaft 40c, a detent lever 40d, a cone lever 40e, a shaft (parking-pawl turn member) 40f, and a detent spring 40g. The parking gear 40a is fixed to the intermediate shaft 26 in the automatic transmission 10. The parking pawl 40b is turnably fixed to a vicinity of a gear of the parking gear 40a. The detent lever 40d has a plurality of detents at one end, and is turnably connected at the other end to the control shaft 40c. The cone lever 40e is connected at one end to the detent lever 40d, and has a cone 40e1 at the other end. The detent spring 40g holds the detent lever 40d by engagement with the detents of the detent lever 40d.

The parking pawl 40b is turnable around a turn shaft 40b1. One end portion of the parking pawl 40b has a pawl portion 40b2 engageable (meshable) with the gear of the parking gear 40a, and the other end portion thereof is contactable with the cone 40e1 of the cone lever 40e. The cone lever 40e has a spring 40e2 that biases the cone 40e1 toward the parking pawl 40b.

The shaft 40f is formed by a shaft mechanically connected to a select lever (not illustrated) disposed at a driver's seat in the vehicle or a shaft connected to an actuator in the case of a shift by wire type.

In the parking mechanism 40, the cone lever 40e is moved forward or backward relative to the parking pawl 40b by the rotation of the shaft 40f. More specifically, when the cone lever 40e moves forward, it turns the parking pawl 40b around the turn shaft 40b1 in a direction away from the parking gear 40a so that the pawl portion 40b2 provided at the other end engages (meshes) with the gear of the parking gear 40a. Thus, the rotation of the intermediate shaft 26 stops, and running of the vehicle stops.

The support plate 20 will be described with reference to FIGS. 4 and 5. The support plate 20 includes a cylindrical body part 20a for supporting the shaft 16, and an extending part 20b extending from the body part 20a.

As illustrated in FIGS. 2 and 4, the body part 20a of the support plate 20 is fastened (fixed) to the transmission case 10a by bolts 22. More specifically, as illustrated in FIG. 5, the body part 20a of the support plate 20 has a plurality of, specifically, six bolt holes 42a, 42b, 42c, 42d, 42e, and 42f in which six bolts 22 are to be inserted, respectively. The body part 20a is fastened to the transmission case 10a by inserting the bolts 22 in the bolt holes 42a to 42f.

As illustrated in FIG. 5, a seventh bolt hole 42g is provided in a distal end of the extending part 20b of the support plate 20, and a turn-shaft insertion hole 42h, in which the turn shaft 40b1 of the parking pawl 40b is to be inserted, is provided between the bolt hole 42g and the bolt hole 42a.

That is, as illustrated in FIGS. 4 and 5, a bolt (first bolt) 44 is inserted as a fastening portion in the bolt hole 42g provided at the distal end of the extending part 20b of the support plate 20, so that (the extending part 20b of) the support plate 20 is fastened to the transmission case 10a.

The turn shaft 40b1 of the parking pawl 40b is inserted in the turn-shaft insertion hole 42h provided near the center of the extending part 20b of the support plate 20. Hence, the parking pawl 40b turns around the turn shaft 40b1 within a turn range regulated by the bolt 44 (fastening portion) so that the pawl portion 40b2 can engage with the gear of the parking gear 40a.

In this way, the support plate 20 rotatably supports the shaft 16, that is, the shaft 16 connected via the gear 24 to the intermediate shaft 26 to which the parking gear 40a of the automatic transmission 10 is fixed.

On the other hand, the parking gear 40a is fixed to the intermediate shaft 26. However, since the shaft 16 and the intermediate shaft 26 are connected by the gear 24, they can be regarded as identical functionally.

Accordingly, the shaft 16 and the intermediate shaft 26 are each generically referred to as an intermediate member 46 in the present specification, or as part of an intermediate assembly. In other words, the intermediate member 46 means the shaft 16 or the intermediate shaft 26. Since the parking gear 40a can also be fixed to the output shaft 34, as in the technique described in Patent Document 1, a target to which the parking gear 40a is fixed refers to a part formed by any of the output shaft 34 and the intermediate member 46 (intermediate member 46 in the embodiment) in this specification.

As described above, the parking mechanism 40 for the vehicle according to the embodiment includes the automatic transmission 10 housed in the transmission case 10a to change the speed of rotation of the vehicle-mounted driving source 14 input from the input shaft 12 and to transmit the rotation from the output shaft 34 to the driving wheels, the parking gear 40a fixed to the part formed by any of the output shaft 34 of the automatic transmission 10 and the intermediate member 46 connected to the output shaft 34 (more specifically, the intermediate member 46), the parking pawl 40b turnably attached to the turn shaft 40b1 that is supported by the plate fastened to the transmission case 10a by the first bolt 44 and the second bolts, and the parking-pawl turn member (shaft) 40f that turns the parking pawl 40b into engagement with the parking gear 40a. The extending part 20b extending from the support plate (support member) 20 for rotatably supporting the part of the automatic transmission 10 (intermediate member 46) is substituted for the plate, and the extending part 20b is fastened to the transmission case 10a by the first bolt 44. Hence, it is possible to remove the plate that increases the size of the transmission case because it is fastened at two points in the technique of Patent Document 1. Moreover, since the extending part 20b is fastened to the transmission case 10a by the first bolt 44, the bolts 22 that fasten (the body part 20a of) the support plate (support member) 20 to the transmission case 10a can also function as the second bolt used to fasten the plate. This can eliminate one bolt and one bolt hole. Hence, the space efficiency can be enhanced, and reduction in size, weight, and cost can be achieved.

Since the support plate (support member) 20 is a structure that supports the part formed by any of the output shaft 34 of the automatic transmission 10 and the intermediate member 46 connected thereto, more specifically, the intermediate member 46, it originally has sufficient rigidity. Hence, the support plate 20 can bear the reaction force produced when the parking pawl 40b engages with the parking gear 40a.

Further, since the support plate (support member) 20 originally has sufficient rigidity, it can prevent the parking pawl 40b from being tilted by the reaction force acting on the parking pawl 40b. This can stabilize the operation of the parking mechanism 40.

While the parking gear 40a is fixed to the intermediate member 46, more specifically, to the intermediate shaft 26 in the above, it may be fixed to the output shaft 34 or the shaft 16.

A parking mechanism for a vehicle according to an aspect of an embodiment of the present application includes an automatic transmission housed in a transmission case to change a speed of rotation of a vehicle-mounted driving source input from an input shaft and to transmit the rotation from an output shaft to driving wheels, a parking gear fixed to a part formed by any of the output shaft of the automatic transmission and an intermediate member connected to the output shaft, a parking pawl turnably attached to a turn shaft that is supported by a plate fastened to the transmission case by a first bolt and a second bolt, and a parking-pawl turn member that turns the parking pawl into engagement with the parking gear. An extending part formed by extending a support member that turnably supports the part of the automatic transmission is substituted for the plate, and the extending part is fastened to the transmission case by the first bolt.

In this case, it is possible to remove the plate that increases the size of the transmission case because it is fastened at two points in the technique of Patent Document 1. Moreover, since the extending part is fastened to the transmission case by the first bolt, the bolt used to fasten the support member to the transmission case can also function as the second bolt used to fasten the plate. This can eliminate one bolt and one bolt hole. Hence, the space efficiency can be enhanced, and reduction in size, weight, and cost can be achieved.

Since the support member is a structure that supports the part formed by any of the output shaft of the automatic transmission and the intermediate member connected thereto, it originally has sufficient rigidity. Hence, the support member can bear the reaction force produced when the parking pawl is engaged with the parking gear. Further, since the support member originally has sufficient rigidity, it can prevent the parking pawl from being tilted by the reaction force acting on the parking pawl. This can stabilize the operation of the parking mechanism.

Obviously, numerous modifications and variations of the present invention are possible in light of the above teachings. It is therefore to be understood that within the scope of the appended claims, the invention may be practiced otherwise than as specifically described herein.

What is claimed is:

1. A parking mechanism for a vehicle, comprising:
   an automatic transmission housed in a transmission case to transmit a rotation of a vehicle-mounted driving source to driving wheels via an input shaft and via an output shaft;
   a parking gear fixed to an intermediate assembly of the automatic transmission connected to the output shaft;
   a support member fixed within the transmission case, the support member having a cylindrical body part turnably supporting a part of the intermediate assembly of the automatic transmission which is rotated by a rotation input from the vehicle-mounted driving source, the support member having an extending part which is fastened to the transmission case via a first bolt and a second bolt, the extending part extending directly from the cylindrical body part;
   a parking pawl turnably attached to a turn shaft that is directly supported by the extending part; and
   a parking-pawl drive member configured to turn the parking pawl to engage with the parking gear.

2. The parking mechanism according to claim 1, wherein the cylindrical body part is fastened to the transmission case via the second bolt.

3. The parking mechanism according to claim 1, wherein the extending part has a first bolt hole in which the first bolt is to be inserted, has a second bolt hole in which the second bolt is to be inserted, and has a turn-shaft insertion hole in which the turn shaft is to be inserted between the first bolt hole and the second bolt hole.

\* \* \* \* \*